(No Model.)
A. B. WILSON.
PRINTER'S QUOIN.
No. 457,501. Patented Aug. 11, 1891.
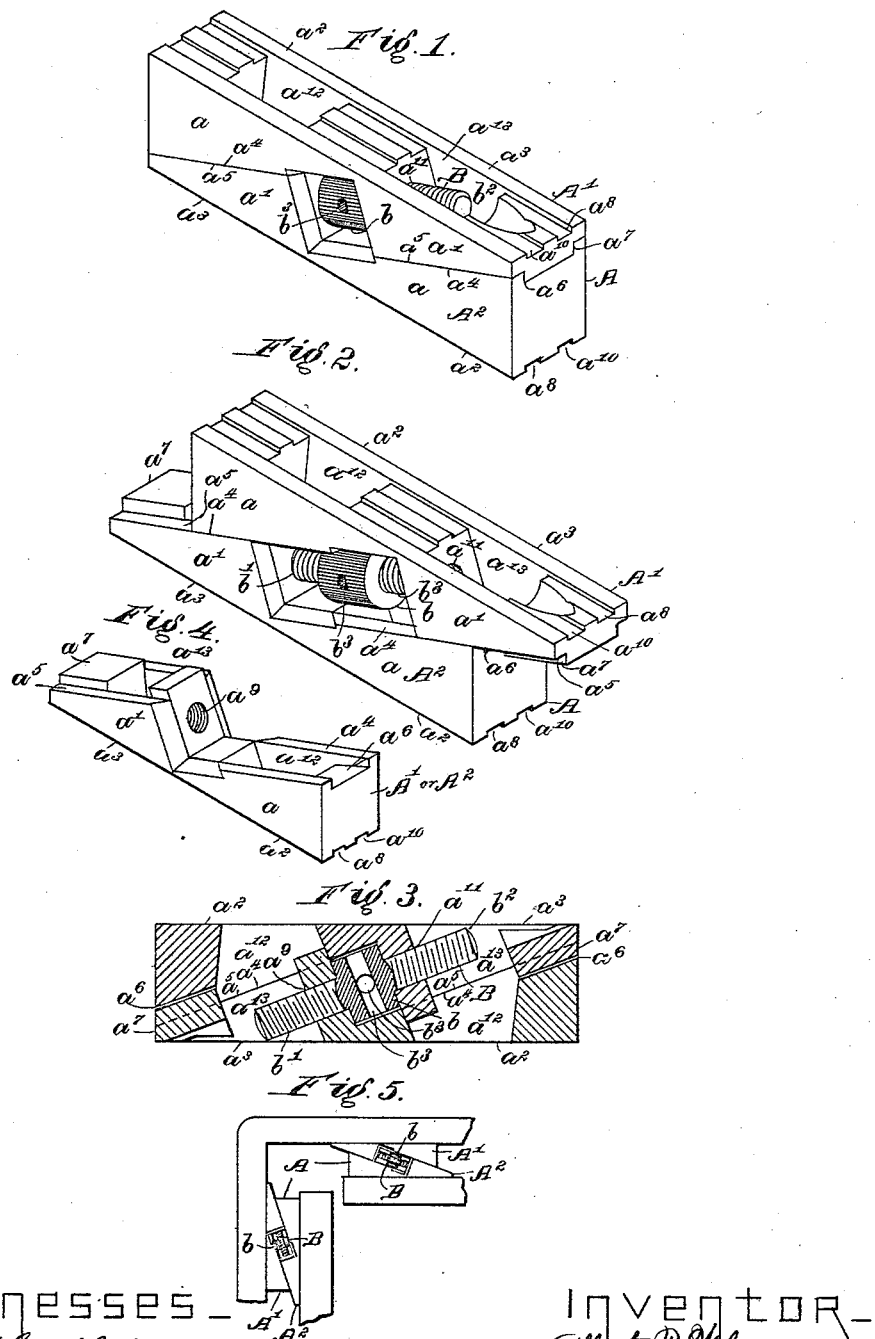

UNITED STATES PATENT OFFICE.

ALBERT B. WILSON, OF LOWELL, MASSACHUSETTS.

PRINTER'S QUOIN.

SPECIFICATION forming part of Letters Patent No. 457,501, dated August 11, 1891.

Application filed April 16, 1891. Serial No. 389,151. (No model.)

*To all whom it may concern:*

Be it known that I, ALBERT B. WILSON, a citizen of the United States, residing at Lowell, in the county of Middlesex and Commonwealth of Massachusetts, have invented a certain new and useful Improvement in Printers' Quoins, of which the following is a specification.

My invention relates to quoins or wedges used by printers for locking up columns or pages of type in a chase for printing, the object of said invention being to furnish a quoin having a great range of spread, quickly adjustable to lock up or unlock the form, retaining its adjustment unaffected by the jar of the press, and having all its parts connected.

In the accompanying drawings, Figure 1 is an isometric perspective view of a quoin constructed according to my invention, the quoin being closed; Fig. 2, a similar view of said quoin spread; Fig. 3, a vertical longitudinal central section of said quoin closed; Fig. 4, an isometric perspective view of one of the counterparts of said quoin; Fig. 5, a plan of a part of a chase, some furniture, and a pair of quoins spread between said furniture and the sides of said chase.

The quoin A consists of two counterparts $A'$ $A^2$, precisely alike, one of said parts being inverted and turned end for end with respect to the other of said counterparts. Each counterpart consists, substantially, of two wedges $a$ $a'$, arranged with the thin edge of one wedge against the thickest portion of the other wedge and having one of the converging faces $a^2$ $a^3$ of each of said wedges $a$ $a'$ in the same horizontal plane, both wedges of the same counterpart being cast or otherwise formed in one piece. The other converging faces $a^4$ $a^5$ of the wedges $a$ $a'$ are parallel with each other in each counterpart. Each wedge $a$ is provided on its inclined surface $a^4$ with a groove $a^6$, and each wedge $a'$ is provided on its inclined face $a^5$ with a projecting tongue adapted to have a sliding fit in the groove $a^6$ of the other counterpart, said tongues and grooves preventing lateral displacement of the counterparts, but allowing said counterparts to slide longitudinally on each other.

A screw B is provided midway between its ends with an annular collar $b$, and the shank or shanks of said screw are provided with right and left handed screw-threads $b'$ $b^2$, as shown in Fig. 3, one of said shanks entering a screw-threaded hole $a^9$ in the wedge $a'$ of one counterpart and the other of said shanks entering a threaded hole $a^{11}$ in the wedge $a'$ of the other counterpart, the axis of said screw being parallel with the faces $a^4$ $a^5$ of each counterpart and with the sides or triangular faces of said wedges. The collar $b$ is milled to enable the screw B to be turned readily by the fingers until the straight outer faces of the quoin come in contact with the furniture and walls of the chase, and is also provided with radial holes $b^3$ to enable said screw to be turned by a pin or small handspike inserted in said holes, when the pressure upon the quoin becomes so great as to make it difficult or impossible to turn said screw further by means of the fingers. Obviously the outer converging faces $a^2$ $a^3$ of each counterpart will at all times be parallel with the corresponding faces of the other counterpart whatever be the spread of the quoin.

The faces of the quoin which come in contact with the chase and furniture may be provided with longitudinal grooves $a^8$ $a^{10}$, one or more in number, to lessen the longitudinal friction of the parts on said chase and furniture and to increase the vertical friction on said chase and furniture and to decrease the liability of the quoins dropping out of the chase.

Each of the counterparts may be recessed at $a^{12}$ $a^{13}$ to lessen the weight of the quoin. The angle between the converging sides of each wedge of each counterpart is so great as to give a great spread to the quoin by a comparatively small longitudinal movement of the counterparts on each other. The milled head or collar $b$ of the screw B enables the quoin to be adjusted very quickly when out of contact with either the chase or the furniture, and the friction of the counterparts on said screw prevents said counterparts from being moved on each other by the jar of the printing-press.

I claim as my invention—

A printer's quoin consisting of two counterparts adapted to slide on each other, each counterpart having an outer straight face and an inner face having parallel inclines, and a screw having a right-hand thread and a left-hand thread, said screw being arranged parallel with said inclines and engaging screw-threaded holes with which said counterparts are provided, as and for the purpose specified.

In witness whereof I have signed this specification, in the presence of two attesting witnesses, this 13th day of April, A. D. 1891.

ALBERT B. WILSON.

Witnesses:
ALBERT M. MOORE,
JOHN B. JONES.